G. M. TEW.
TIRE.
APPLICATION FILED MAR. 17, 1915.
1,182,113.
Patented May 9, 1916.
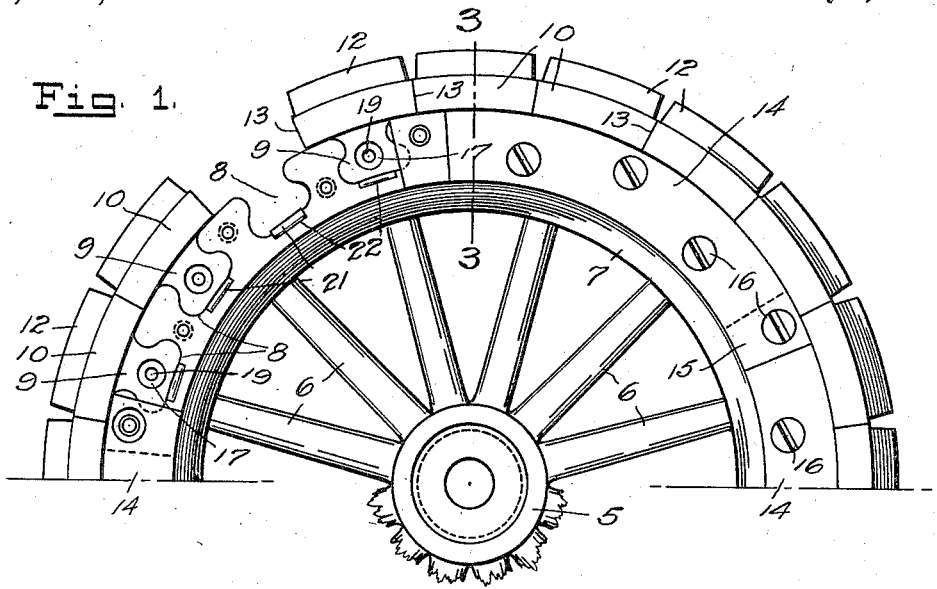
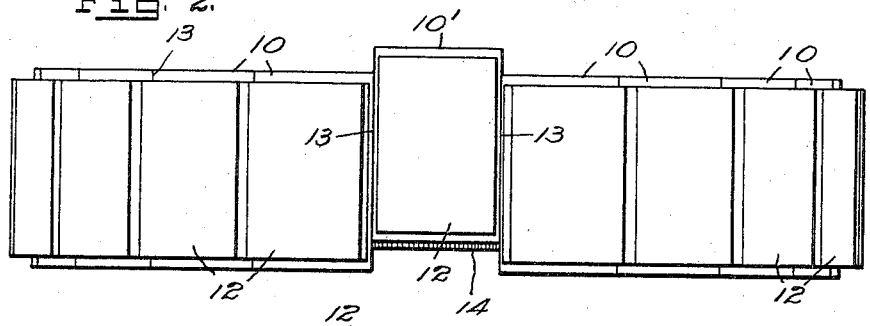
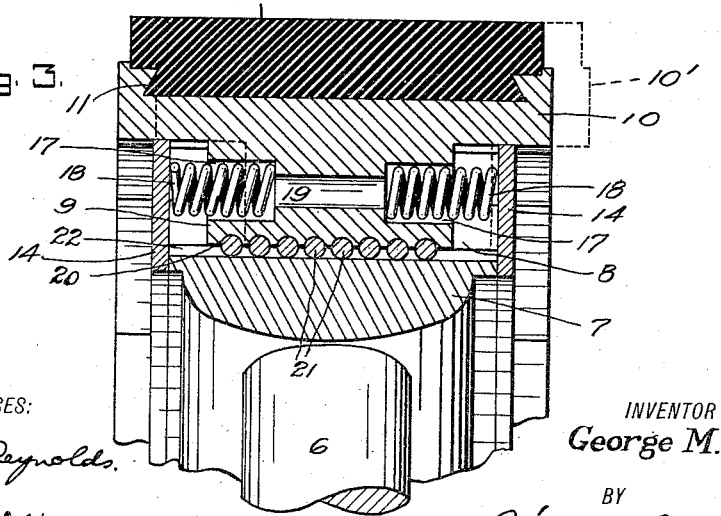
WITNESSES:
Charles L. Reynolds.
E. Peterson.
INVENTOR:
George M. Tew
BY
Pierre Barnes
ATTORNEY

UNITED STATES PATENT OFFICE.

GEORGE M. TEW, OF KIRKLAND, WASHINGTON.

TIRE.

1,182,113. Specification of Letters Patent. Patented May 9, 1916.

Application filed March 17, 1915. Serial No. 14,900.

*To all whom it may concern:*

Be it known that I, GEORGE M. TEW, a citizen of the United States, residing at Kirkland, in the county of King and State of Washington, have invented certain new and useful Improvements in Tires, of which the following is a specification.

This invention relates to improvements in tires.

The tires of the class to which my invention is particularly applicable are those which are employed upon wheels under the rear of a motor truck and especially where four wheels are utilized as for example, in the running gear described in my patent application, Serial No. 14,901, of March 17 1915, wherein a lateral movement of one or more of the wheels is requisite for steering purposes.

The object of the present invention is to produce an effective, strong and durable tire composed of tread elements which are yieldingly and independently movable laterally to accommodate themselves to changes in the direction of travel of a vehicle.

The invention is illustrated in the accompanying drawings, wherein—

Figure 1 is a side view of a portion of a wheel with my invention applied thereto and with parts omitted. Fig. 2 is a plan view of the same and illustrated with one of the tire tread blocks in offset position. Fig. 3 is a detail sectional view taken through 3—3 of Fig. 1.

Referring to said drawings, 5 represents the hub; 6 represents the spokes; and 7 represents the rim or felly of a wheel. In this invention, said rim is provided with a series of grooves 8 arranged parallel to the axis of the wheel and of substantially dove-tail shapes in cross section but fashioned with rounded corners, as shown in Fig. 1. Fitting within each of said grooves is the tongue element 9 of a tread block 10 which may have in its outer side a recess 11 for the reception of a tread-piece 12, preferably formed of rubber or a resilient body containing rubber. Said blocks are of segmental shapes and of widths to have their sides 13 contact with one another, or nearly so. At opposite sides of said rim is a ring which may be comprised of a plurality of segmental sections 14 having overlapping ends 15. These rings are rigidly secured to the felly in any suitable manner, as by screws 16. The lengths of the block-tongues 9 are less than the distance between said rings, and the lengths of blocks 10 are greater than such distance so as to allow a certain amount of lateral movements to the blocks without uncovering the respective grooves 8.

In each end of a block-tongue 9 is provided a recess 17 to accommodate a helical spring 18 whose outer end bears against the adjacent ring. The pair of opposing springs for a block act to yieldingly retain the latter in position centrally of the width of the wheel so that when from any force a block is displaced laterally relatively to the wheel, or vice versa, the spring which is compressed thereby will assert its power to restore the block to its normal position when such force is removed.

19 represents a hole connecting the recesses 17 of a tongue for the passage therethrough of a lubricant oil with which a groove 8 may be charged.

In the extremity of a tongue are provided pockets 20 for rollers 21, or equivalent devices, which track in a guideway 22 provided in the rim at the bottom of a groove 8 to serve as anti-friction bearings which receive the load or thrusts imparted to a block radially of the wheel.

In operation, a vehicle in turning will impart a pull or push to the rear wheels in axial directions and under such conditions the tread members which are in contact with the road surface will be constrained by the frictional contact therewith, against any lateral displacement, resulting in the wheels sliding, so to speak, upon the tread carrying blocks to accommodate themselves to the turning of the vehicle. When the relatively displaced blocks have been revolubly carried from the ground surface the previously compressed springs will thereupon assert their power to return the blocks to their normal positions.

What I claim is—

1. The combination of a wheel rim, tread-blocks secured to said rim against any radial movements but adapted to independent lateral movements, and springs tending to maintain said blocks in alined positions.

2. The combination of a wheel rim, tread-blocks connected to said rim against any radial movements but adapted to independent lateral movements, springs tending to maintain said blocks in alined positions, and anti-friction bearings interposed between the blocks and said rim.

3. The combination of a wheel rim having a series of spaced recesses in its periphery, tread-blocks having tongues extending into the respective recesses to afford lateral movements of blocks, and securing the latter against relative circumferential movements, and springs engaging said tongues and serving to normally hold each of the blocks in alinement with the other blocks.

4. The combination with a wheel rim, tread-blocks connected to said rim so as to have relative lateral movements, means tending to yieldingly retain each block in alined position with respect to the other blocks, and means to positively secure the blocks to the rim with respect to circumferential movements.

5. The combination of a wheel rim, a ring rigidly secured to each side of said rim, a tread-block extending into the rim and having portions overlying the respective rings and springs interposed between the block and the respective rings for yieldingly retaining the block against lateral movements relative to the wheel.

6. The combination of a wheel provided with a rim having transversely arranged grooves therein, of substantially dove-tail shapes in cross section, a tread-block for each of said grooves and provided with tongues which are fitted within the respective grooves for relative lateral movements, and springs carried by the wheel and acting against the ends of the block-tongues to individually and yieldingly hold said blocks in alinement circumferentially of the wheel.

Signed at Seattle, Washington, this 11th day of March, 1915.

GEORGE M. TEW.

Witnesses:
PIERRE BARNES,
E. PETERSON.